2,726,163
METHOD OF PRODUCING MATERIALS FOR ROAD CONSTRUCTION

Adolf Wagner, Eislingen (Fils), and Friedrich Hugel, Stuttgart-Oberturkheim, Germany, assignors to the firm Zeller & Gmelin, Eislingen (Fils), Germany No Drawing. Application February 12, 1952, Serial No. 271,295

Claims priority, application Germany February 14, 1951

8 Claims. (Cl. 106—277)

The present invention is concerned with a process for the production of materials for roads using emulsions of bituminous materials for the coating of mineral constituents.

Most of the hitherto known manufacturing processes for road construction materials using bituminous binding agents are more or less subject to weather conditions. For the treatment of bituminous binding agents in the hot process for the production of construction materials, as well as for their application, the mineral constituents must be dry. The emulsions of bituminous binding agents used in road construction for the production of coated gravel break down relatively slowly, which gives rise to the disadvantage of a retarded setting after application of the emulsion mixed with broken stones. The separation of the water of the emulsion only takes place relatively late after the application of such emulsions, so that there is delay in the hardening of the road. As long as the setting process is not complete, the bituminous emulsion can be washed away by rain or moisture during or after its application.

We have now found that if phenolate liquor, which promotes the breakdown of the bituminous emulsion is brought together with the mineral constituents and the bituminous emulsion the inherent disadvantages of the known processes are avoided.

According to the present invention therefore we provide a process for the production of materials for road construction and the like, in which mineral constituents are so treated that they become coated with a bituminous emulsion containing phenolate liquor or phenolate lye.

In a preferred embodiment of the process the mineral constituents are moistened all over with phenolate liquor and then mixed with the emulsion of bituminous materials. The wetting agent, that is the phenolate liquor, which promotes the breakdown of the bituminous emulsion can also be added from the outset to the emulsion and this can then be mixed with the mineral constituents.

The amounts of phenolate liquor and bituminous emulsion to be employed depend on the type of mineral constituents used, their grain sizes and the like, and can easily be determined by known simple preliminary tests.

With economic use of bituminous emulsion and independently of the degree of moisture or the mineral constituents a satisfactory, well adhering, greasy black shiny mixture is obtained. The mineral constituents can be worked in in dry and wet condition. Shortly after mixing, the mixture which originally appeared brown, assumes a greasy shiny, deep black colour, which is an indication of the breaking of the bituminous emulsion.

Whilst until now relatively slow-breaking bituminous emulsions have been used in the production of mixes or substances, which caused a delay in the breaking of the emulsion have been added to unstable emulsions; in the process according to the invention phenolate liquor is used, which hastens the breaking of the emulsion. Shortly after bringing together the emulsion of bituminous materials and the mineral constituents wetted with phenolate liquor the breaking down of the emulsion begins. The mix can then forthwith be applied and set by pressure. It can easily be handled and shovelled; roller appliances and the like remain clean, because a thin layer of water, which covers the gravel provided with a bituminous coating on the outside, prevents the fouling of the implements with the bituminous binding agents. Immediately after its application and solidification it can be opened to road traffic. The construction materials obtained by the process according to the invention can also be handled in wet and cold weather.

According to the process of the invention not only can mineral constituents of uniform grain sizes be handled but also mixtures of varying coarseness.

The construction materials prepared according to the invention can not only be used for road construction, but also for similar purposes.

In order that the invention may be well understood, the following example is given only as an illustration:

Example 100 liters of gravel of grain ⅜ mm. are mixed in a mixing device with 2 liters of phenolate liquor, until the surfaces of the stones are entirely moistened with the liquor. 10 liters of a 60% bituminous emulsion are then immediately added and the mixing continued until the stones are evenly coated. The mixing is then stopped, the mixer emptied and the gravel placed in heaps. Shortly after emptying the breaking of the emulsion commences and the water of the emulsion begins to separate. The bitumen film for the time being remains coated with a layer of water, so that the heaps remain for weeks capable of being shovelled and used for construction. Only when compressed by rolling or the like after use does the mixture set. It is then immediately capable of being driven on. The bitumen coating the mineral can then no longer be washed away by water, rain or snow.

The term "phenolate liquor" or "phenolate lye" as used in the foregoing specification and in the claims has a distinct meaning for the man skilled in the art. As generally known phenols are removed from mixtures of aromatic hydrocarbons containing creosote with the aid of alkali metal hydroxides and the alkali metal phenolates thus obtained are named "phenolate liquor" or "phenolate lye." The phenolate liquor or phenolate lye contains not only the alkali metal salts of simple phenols but also alkali metal salts of polyhydric and homologous phenols.

What we claim is:

1. A method of producing materials for road construction and the like which comprises providing mineral constituents in subdivided form, coating said constituents with a liquor of alkali metal phenolate and thereafter coating said constituents with an aqueous emulsion of bituminous materials.

2. A method of producing materials for road construction and the like which comprises providing mineral constituents in subdivided form and in a substantially dry condition, coating said constituents with a liquor of alkali metal phenolate, and thereafter coating said constituents with an aqueous emulsion of bituminous materials.

3. A method of producing materials for road construction and the like which comprises providing mineral constituents in subdivided form, said constituents being of varying grain sizes, coating said constituents with a liquor of alkali metal phenolate, and thereafter coating said constituents with an aqueous emulsion of bituminous materials.

4. A method of producing materials for road construction and the like which comprises providing mineral constituents in subdivided form, said constituents being of uniform grain size, coating said constituents with a liquor of alkali metal phenolate, and thereafter coating said constituents with an aqueous emulsion of bituminous materials.

5. A method of producing materials for road construction and the like which comprises providing mineral constituents in subdivided form and in a moist condition, coating said constituents with a liquor of alkali metal phenolate, and thereafter coating said constituents with an aqueous emulsion of bituminous materials.

6. A method of producing materials for road construction and the like which comprises providing mineral constituents in subdivided form, mixing therewith an amount of a liquor of alkali metal phenolate to moisten the surfaces of said constituents, and immediately thereafter mixing said constituents with an aqueous bituminous emulsion.

7. A method of producing materials for road construction and the like which comprises providing mineral constituents in subdivided form, mixing therewith an amount of a liquor of alkali metal phenolate to moisten the surfaces of said constituents, said amount being about 2 liters to 100 liters of said constituents, and immediately thereafter mixing said constituents with an aqueous bituminous emulsion.

8. A method of producing materials for road construction and the like which comprises providing mineral constituents in subdivided form, mixing therewith an amount of a liquor of alkali metal phenolate to moisten the surfaces of said constituents, said amount being about 2 liters to 100 liters of said constituents, and immediately thereafter mixing said constituents with an aqueous bituminous emulsion in the amount of about 10 liters of a 60% bituminous emulsion.

References Cited in the file of this patent

FOREIGN PATENTS

| | | |
|---|---|---|
| 421,269 | Great Britain | Dec. 6, 1934 |
| 383,011 | France | Feb. 22, 1908 |
| 42,965 | France | Jan. 16, 1934 |